United States Patent Office 2,886,210
Patented May 12, 1959

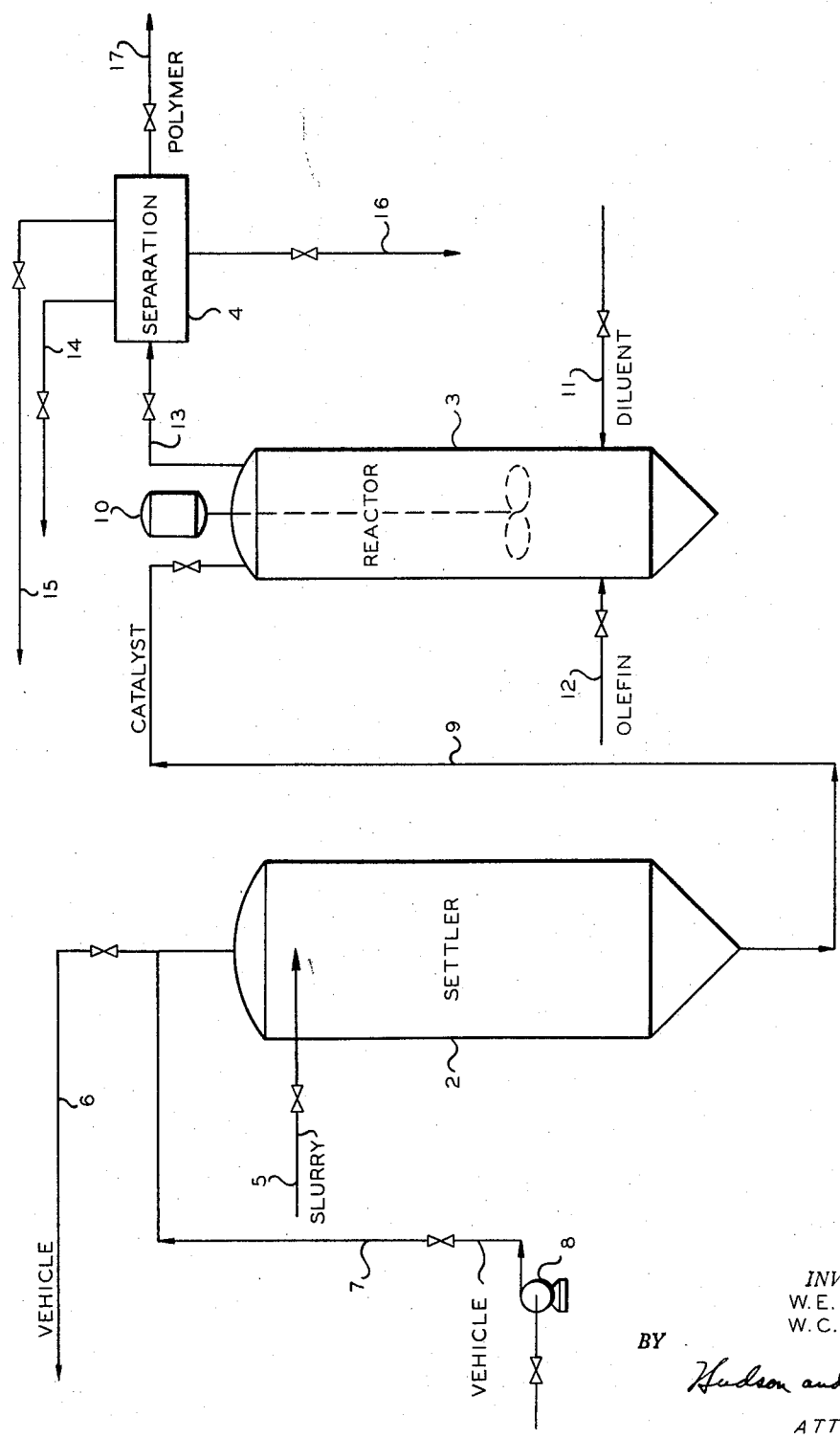

2,886,210

TRANSFER OF SOLIDS

Wayne E. Cooper and Walter C. Pouppirt, Bartlesville, Okla., assignors to Phillips Petroleum Company, a corporation of Delaware Application September 28, 1956, Serial No. 612,693

10 Claims. (Cl. 222—1)

This invention relates to a method for transferring subdivided solids. In one aspect it relates to a process in which solids are settled from a slurry as a compact mass and transferred while in this form by the application of fluid pressure. In another aspect the invention relates to the transfer of wet compacted solids by the use of a displacing fluid, the quantity of solids transferred being controlled by controlling the quantity of said fluid.

The simultaneous movement and measurement of solids presents a difficult problem in that conventional flow measuring devices are unable to withstand the erosive effect of solids for any appreciable period of time. One device frequently used is a positive displacement pump but this type of apparatus provides accurate measurement for only a limited time, after which either replacement or repair of the pump becomes necessary.

It is an object of this invention to provide an improved process for transferring solids.

Another object of this invention is to provide an improved process for transferring wet finely divided compacted solids.

Still another object of this invention is to provide an improved process for transferring wet and finely divided solids in a compact mass and measuring the quantity of said solids transferred.

Yet another object of this invention is to provide an improved process for transferring wet finely divided solids, comprising chromium oxide containing hexavalent chromium on silica-alumina, in a compact mass and measuring the quantity of said solids transferred.

These and other objects of the invention will become more readily apparent from the following detailed description and discussion.

The transfer of solids in the method of this invention is achieved broadly by displacing a wet compacted solids mass from a confined zone with a fluid and measuring the quantity of displacing fluid to determine the quantity of solids transferred. In one aspect of the invention the transferred solids are compacted by settling the solids from a solids slurry. In another aspect of the invention the solids and liquid are introduced separately to the confined zone whereby wetting and compaction of the solids is provided. In still another aspect of the invention the transferred solids are wetted and compacted by introducing dry solids to a liquid accumulated in the confined zone.

This invention is applicable to the treatment of solids in general, such as for example, inert materials like sand, carborundum, pumice, etc., materials suitable for conversion to reaction products, like coal, shale, lignite, etc., and catalytic materials like metals, metal oxides, for example, silica, alumina, silica-alumina, etc. The solids are subdivided to provide materials whch are readily compacted when wet.

Although any of the solids listed are suitable for treatment in the method of this invention, the invention is particularly applicable in the handling of catalytic materials and in its preferred embodiment is directed to the compacting and transferring of catalysts which are employed in the polymerization of olefinic materials to solid polymers thereof.

The olefin polymerization process can be used to produce a wide variety of olefin polymers, such as, for example: polymers or copolymers of mono-olefins like ethylene, propylene, butylene, etc.; also copolymers of mono-olefins and diolefins such as butadiene, isoprene, etc. These polymers are prepared usually by contacting the olefin to be polymerized with a catalyst in the presence of a solvent or diluent material at an elevated temperature and pressure. A number of catalytic materials can be used for the purpose of polymerizing olefins, the most desirable being chromium oxide, preferably containing hexavalent chromium, associated with silica, alumina, zirconia, thoria, silica-alumina, etc. These catalysts can be prepared, for example, by contacting soluble salts of chromium with silica, alumina, thoria, etc., for a sufficient period of time to impregnate the latter material. Following this, excess liquid is removed, for example, by filtering, after which the solid catalysts are dried and activated at temperatures in the range of 450° F. to 1500° F. under non-reducing conditions for several hours. For a detailed discussion of the catalysts, their composition and their methods of preparation, reference can be had to the copending application of Hogan and Banks, Serial No. 573,877, filed March 26, 1956, now Patent Number 2,825,721, issued March 4, 1958, wherein the catalysts are discussed in detail. These and other solid catalysts or catalysts containing a solid component can be treated in the method of this invention.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is maintained at a sufficient level to assure a liquid phase reaction, that is at least about 100 to 300 p.s.i.g., depending upon the type of feed material, diluent and the polymerization temperature. Higher pressures up to 500 to 700 p.s.i.g. or higher can be used, if desired. The catalyst concentration in the reaction zone is maintained between about 0.01 and about 10 percent by weight. Generally, it is desirable to provide a reactant residence time of between about 15 minutes and about 12 hours.

The use of a diluent in the polymerization reaction in general serves two purposes. Since the reactions are usually exothermic in nature, the presence of a quantity of diluent provides a method for obtaining close control of the reaction temperature. In addition, polymers formed in the reaction, or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually, the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic paraffins having between about 3 and about 12 carbon atoms per molecule, such as, for example, propane, isobutane, n-pentane, isopentane, isooctane, etc. and preferably those acyclic paraffins having 5 to 12 carbon atoms per molecule. Also useful in the polymerization reaction are alicyclic hydrocarbons, such as cyclohexane, methylcyclohexane, etc. Aromatic diluents are also used, however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions may also be employed in carrying out the reaction of olefins to form solid polymers.

In carrying out the invention in one embodiment thereof finely divided solids such as chromium oxide catalyst containing hexavalent chromium supported on silica-aluminum are introduced as a slurry in a liquid to a settling zone wherein the solids separate from the liquid and form wet compact mass. When a predetermined level of solids is obtained in the settling zone the flow of slurry is terminated and the compact solids mass is forced from the lower portion of the settling zone by the application of fluid pressure to the top of the solids mass. With a knowledge of the solids content of the compacted mass, such as by periodical sampling and analysis, the flow rate of the transferred solids can be measured by appropriately controlling the rate of introduction of the pressuring fluid to the settling zone. Control of the fluid flow rate can be obtained by the use of conventional instrumentation for measuring fluid flow and/or by providing a suitable means for transferring the fluid such as a positive displacement pump, which controls the rate of flowing fluid.

It is desirable when introducing the slurry of solids and liquid to the settling zone to provide a minimum of turbulence whereby the solids are settled from the liquid in a short period of time. Thus, it has been found preferable to introduce the slurry to the settling zone tangentially whereby a minimum of disturbance of the liquid and solids contained therein occurs.

The transfer of solids in the method of this invention is based on the fact that when solids of an appropriate size distribution are settled in a liquid the wetted solids form a compact mass which can be moved through a confined zone by a pressuring fluid without appreciable penetration of the fluid into the solid mass. Thus, it is possible to transfer solids from such a mass, without substantially changing the relative proportions of solid and liquid, whereby the quantity of the pressuring fluid provides a direct measurement of the quantity of solids being transferred. With respect to solids size, it has been found that in general, successful operation of the invention is promoted by solids of small particle size. Thus, there is substantially no limit to the minimum particle size which can be employed. However, as the particle size becomes greater the void space can increase to the point where the pressuring fluid will begin to penetrate the solids mass and when a sufficiently large solids particle size is reached, the propelling fluid will pass completely through the compacted solids. It has been found that if a solid of a single particle size is employed that the maximum particle size which can be used to successfully provide a wet solid mass which is substantially impenetrable to the pressuring fluid is between about 40 and about 60 mesh. When, as in ordinary commercial operations, the solids mass covers a range of particle size it is possible to employ in conjunction with the size range given both smaller particles and particles of a larger size up to and including about one-quarter of an inch. In general, however, the average particle size should be not greater than between about 40 and about 10 mesh.

The composition of the wet compacted solids mass being transferred will vary depending upon the particular solids and the particular wetting liquid employed. In general, the solids on a volume basis comprise between about 25 and about 90 percent of the total mass. For example, when transferring a chromium oxide catalyst containing hexavalent chromium supported on silica aluminum wetted with cyclohexane the compacted solids comprise approximately 52 percent by volume of the total mass and the total mass has a density of about 60 pounds per cubic foot.

It is within the scope of the invention to provide transfer of the wet compacted solids from the settling zone by the use of either a gaseous or a liquid pressuring fluid. Inasmuch as liquids are substantially incompressible the problem of measuring liquid flow introduces fewer problems than the measurement of gas flow. Therefore, a liquid fluid is usually preferred. However, in some instances it may be desirable to use a gas for the pressuring fluid rather than a liquid. For example, in the polymerization of ethylene with a chromium oxide catalyst containing hexavalent chromium associated with silica-alumina, it is possible to use ethylene gas as a pressuring medium. Since this gas is employed as a reactant in the polymerization reaction there is no problem of contamination when operating in this manner.

When utilizing a liquid pressuring fluid it is usually preferable that the slurrying liquid and the pressuring liquid be the same. When carrying out the polymerization of ethylene as previously described the pressuring liquid can be selected from any of the solvents listed in the discussion of the polymerization process. The slurrying and pressuring liquid in any particular instance will be determined by the particular solids to be transferred and the service in which the solids are to be employed. Any liquid which is capable of wetting solids for compaction can be used within the scope of the invention.

In the embodiment of the invention just discussed the solids are introduced to the settling zone in the form of a slurry. While this is the preferred method of operation it is within the scope of the invention to introduce the solids to the settling zone for the formation of the wet compacted mass in other manners. For example, dry solids can be introduced to the settling zone into a wetting liquid accumulated therein. When operating in this manner, it may be desirable to provide agitation of the liquid during the filling cycle in order to assure uniform wetting of the solids. It is also within the scope of the invention to separately and simultaneously introduce the wetting liquid and solids to the settling zone. Here again it may be desirable to furnish agitation in order to assure uniform wetting and compaction of the solids.

In order to more clearly define the invention and provide a better understanding thereof reference is had to the attached drawing which is a diagrammatic illustration of a catalyst solids settler and a reactor for the polymerization of olefins. Referring to the drawing catalyst solids subdivided to provide a range of size between about 20 and 60 mesh, comprising chromium oxide containing hexavalent chromium associated with silica alumina, slurried in cyclohexane are introduced through conduit 5 to settler 2. In order to facilitate separation and compaction of the solids the slurry is introduced to the settler tangentially. The flow of slurry to the settler is continued until the settler is substantially full of compacted solids. To provide this quantity of solids requires a total feed which is substantially greater than the settler volume. Accordingly, provision is made to remove excess slurrying liquid from the top of the settler through conduit 6. When the solids in the settler reach the desired predetermined level the flow of the slurry is terminated and a pressure is applied to the top of the settler by introducing cyclohexane through positive displacement pump 8 and conduit 7. When the pressure in the settler reaches a sufficient level above the pressure in the reactor, the valve in conduit 9 is opened and compacted solids are pressured from the bottom of the settler through conduit 9 into reactor 3. At the same time additional cyclohexane and olefin are introduced to the reactor through conduits 11 and 12 respectively. Within the reactor suitable conditions of temperature and pressure are maintained, namely about 285° F. and about 500 p.s.i.a whereby ethylene is converted to solid polymers. To aid in the reaction efficiency and maintain a catalyst in suspension agitation of the contents of the reactor is provided by a motor driven mixer 10. Effluent from the reactor, comprising polymer, cyclohexane, catalyst and unreacted ethylene is passed to a separation zone 4 wherein separation and recovery of ethylene, catalyst, cyclohexane and polymer takes place, these materials being yielded through conduits 14, 15, 16 and 17 respectively.

The compaction of settled catalyst within settler 2 is such that the displacing liquid which enters the settler through conduit 7 penetrates the catalyst mass only a very short distance. Thus, it is possible to displace solids of a substantially constant composition from the settler until this vessel is almost entirely empty. Since the composition of the solids mass does not vary appreciably measurement of the propelling or displacing liquid provides a measurement of the quantity of solids introduced to the reactor. Control of the displacing liquid rate can be provided by suitable instrumentation or as in the present specific example by introducing the displacing liquid to the settler through a positive displacement pump.

When the solids settler is substantially emptied the flow of displacing liquid is terminated and the solid slurry is again introduced to the settler repeating the operation previously described until the settler is again substantially filled with compacted solids. In order to maintain a continuous flow of catalyst to the reactor it is necessary that several settlers be provided to operate in parallel.

The following example is given in illustration of a typical application of a preferred embodiment of the invention on a commercial scale.

Example

Subdivided chromium oxide catalyst (40 to 60 mesh) containing hexavalent chromium associated with silica alumina is slurried in cyclohexane and introduced tangentially to a first settler at a rate of about 1800 lbs. per hour, of which about 180 lbs./hr. comprises solids and the remainder cyclohexane. The settler vessel comprises an elongated cylindrical tank having a conical bottom and a volume of about 55 cubic feet. Within the settler the solids and liquid separate, wetted solids accumulating in the bottom of the settler in a wet compacted mass containing about 51 percent of solids by volume and having a mass of about 60 pounds per cubic foot. Flow of catalyst slurry to the settler is continued for a sufficient period of time to substantially fill the settler with compacted solids, excess liquid being withdrawn overhead from the top of the settler. At this point the flow of slurry is discontinued and cyclohexane is introduced to the top of the settler through a positive displacement pump at a rate of about 0.37 gal. per minute. The bottom of the settler is then opened through conduit 9, which is a standard 2 inch pipe, to reactor 3 which is operated at a temperature of about 285 degrees F. and a pressure of about 500 p.s.i.a. to carry out the polymerization reaction. When the pressure in the settler reaches a sufficient level to overcome the friction drop through conduit 9, namely about 515 p.s.i.a., compacted catalyst is pressured from the settler through this conduit and enters the reactor at a rate equal to the flow of pressuring liquid to the settler. Based on the composition of the compacted solids previously given the catalyst feed rate is thus controlled to provide about 91 pounds of fresh catalyst entering the reactor per hour. Simultaneous with the passage of catalyst into the reactor ethylene is introduced thereto at a rate of about 11,500 pounds per hour and additional cyclohexane is added to provide a diluent-to-polymer ratio in the reactor of about 11.73 to 1. Within the reactor the polymerization reaction provides a solid ethylene polymer product, during which process about 60 percent of the olefin feed is consumed. The reactor effluent, comprising polymer product, unreacted ethylene, cyclohexane and catalyst is passed through a series of separation steps wherein the various components are separated and a suitable polymer product is obtained.

Pressuring of catalyst from the first settler is continued until about 90 percent of this material has been removed. At this time the flow of displacing liquid is terminated. During the time when the first settler is being emptied a second settler is being filled with compacted solids in the previously described manner. When the flow of displacing liquid to the first settler is terminated this liquid is transferred to the second settler and compacted catalyst from the latter settler is then introduced into the reactor. In order to prepare the first settler for use when the second settler becomes emptied, slurried catalyst is again introduced to the first settler and filling of this settler is carried out in the manner previously described. When operating in the foregoing manner, it is possible to provide a metered, constant quantity of catalyst to the reactor without passage of solids through any type of metering or control instrument.

Having thus described the invention by providing a specific example thereof, it is to be understood that no undue limitations or restrictions are to be drawn by reason thereof and that many modifications and variations are within the scope of the invention.

We claim:

1. A process for transferring subdivided solids which comprises feeding solids and liquid to a confined zone wherein the solids settle from the liquid to form a wet compacted mass, introducing an additional quantity of said liquid under pressure to the confined zone, pressuring compacted solids from the confined zone with the additional liquid and controlling the rate of flow of said solids by the rate of introduction of the additional liquid.

2. The process of claim 1 in which the solids and liquid are introduced separately to the confined zone.

3. The process of claim 1 in which the liquid is first introduced to the confined zone and the solids are then introduced to liquid accumulated in said zone.

4. The process of claim 1 in which the solids and liquid are introduced to the confined zone as a slurry.

5. The process of claim 4 in which the solids slurry is introduced tangentially to the confined zone.

6. A cyclic process for transferring subdivided solids comprising chromium oxide containing hexavalent chromium associated with silica-alumina which comprises feeding said solids and cyclohexane to a confined zone wherein the solids settle from the liquid to form a wet compacted mass, discontinuing the feed to the confined zone when a predetermined level of compacted solids is obtained, introducing additional cyclohexane under pressure to the confined zone, pressuring compacted solids from the confined zone with the additional cyclohexane, and controlling the rate of flow of said solids by the rate of introduction of the additional cyclohexane.

7. The process of claim 6 in which the solids and liquid are introduced separately to the confined zone.

8. The process of claim 6 in which the liquid is first introduced to the confined zone and the solids are then introduced to liquid accumulated in said zone.

9. The process of claim 6 in which the solids and liquid are introduced to the confined zone as a slurry.

10. The process of claim 9 in which the solids slurry is introduced tangentially to the confined zone.

References Cited in the file of this patent

UNITED STATES PATENTS

| | | |
|---|---|---|
| 1,553,476 | Schuster | Sept. 15, 1925 |
| 2,638,424 | Hansgirg | May 12, 1953 |
| 2,680,084 | Ryan | June 1, 1954 |
| 2,713,037 | Kimberlin | July 12, 1955 |
| 2,721,226 | Ciapetta et al. | Oct. 18, 1955 |

FOREIGN PATENTS

| | | |
|---|---|---|
| 268,667 | Great Britain | Apr. 7, 1927 |
| 431,755 | France | Nov. 20, 1911 |